US010657601B1

(12) United States Patent
Kobori et al.

(10) Patent No.: US 10,657,601 B1
(45) Date of Patent: *May 19, 2020

(54) INSURANCE PREMIUM GAP ANALYSIS

(71) Applicant: Allstate Insurance Company, Northbrook, IL (US)

(72) Inventors: Larry Shigeo Kobori, Newark, CA (US); Wynee Chai-Wei Lin, Mountain View, CA (US)

(73) Assignee: Allstate Insurance Company, Northbrook, IL (US)

( * ) Notice: Subject to any disclaimer, the term of this patent is extended or adjusted under 35 U.S.C. 154(b) by 320 days.

This patent is subject to a terminal disclaimer.

(21) Appl. No.: 15/595,344

(22) Filed: May 15, 2017

Related U.S. Application Data

(60) Division of application No. 13/705,755, filed on Dec. 5, 2012, now Pat. No. 9,704,199, which is a continuation of application No. 13/175,490, filed on Jul. 1, 2011, now Pat. No. 8,352,295, which is a continuation of application No. 12/141,758, filed on Jun. 18, 2008, now Pat. No. 7,996,247.

(60) Provisional application No. 60/952,984, filed on Jul. 31, 2007.

(51) Int. Cl.
*G06Q 40/08* (2012.01)
(52) U.S. Cl.
CPC .................... *G06Q 40/08* (2013.01)
(58) Field of Classification Search
CPC ........ G06Q 10/00; G06Q 20/00; G06Q 30/00; G06Q 40/00
USPC ...................................... 705/3–44
See application file for complete search history.

(56) References Cited

U.S. PATENT DOCUMENTS

| 4,742,457 | A | 5/1988 | Leon et al. |
| 5,316,502 | A * | 5/1994 | Loet ................ H01H 85/201 |
| | | | 439/620.26 |
| 5,974,396 | A | 10/1999 | Anderson et al. |
| 6,026,381 | A | 2/2000 | Barton, III et al. |
| 6,076,072 | A | 6/2000 | Libman |
| 6,332,163 | B1 | 12/2001 | Bowman-Amuah |
| 6,411,938 | B1 * | 6/2002 | Gates ................. G06Q 20/042 |
| | | | 705/30 |
| 7,107,224 | B1 | 9/2006 | Weller et al. |
| 7,222,079 | B1 | 5/2007 | Seare et al. |

(Continued)

OTHER PUBLICATIONS

Aon Benfield, "Global Insurance Market Opportunities", Insurance Risk Study, Tenth Edition. (Year: 2015).*

(Continued)

*Primary Examiner* — Frantzy Poinvil
(74) *Attorney, Agent, or Firm* — Banner & Witcoff, Ltd.

(57) ABSTRACT

A method and apparatus for determining the amount of premium, policies, or quotations needed to improve market share in various geographic locations based on user selected criteria. The method comprises calculating a total estimated expenditure on insurance by zip code, an estimated market share for an insurance provider by zip code, a year-to-date sale-to-quote ratio by zip code, and finally the amount of premiums, policies, or quotations needed to achieve a market share in a zip code. The method and apparatus will also display or output demographic data, market data, insurance provider information, and calculated amounts of premiums, policies, or quotations needed to achieve a market share in a given zip code.

20 Claims, 13 Drawing Sheets

502

| Zip Code | Total Number of HH, 2006 | Ave HH Expenditure on Vehicle Insurance, 2006 | Total Expenditure on Vehicle Insurance, 2006 | Adjusting Factor, 2006 | Adjusted Total Expenditure on Vehicle Insurance, 2006 | Current Avg HH Auto Prem |
|---|---|---|---|---|---|---|
| xxxxx | 14,351 | $1,821 | $26,128,579 | 0.97 | $25,321,932 | 1,764 |
| yyyyy | 9,117 | $1,748 | $15,936,334 | 0.97 | $15,444,344 | 1,694 | n / o / n2 / z / aa / aab

Table 7

(56) References Cited

U.S. PATENT DOCUMENTS

| | | | |
|---|---|---|---|
| 7,395,240 | B2 | 7/2008 | Siska |
| 7,657,479 | B2 * | 2/2010 | Henley .................. G06F 19/328 |
| | | | 705/37 |
| 7,769,609 | B1 | 8/2010 | Woll |
| 7,774,252 | B2 | 8/2010 | Scare et al. |
| 7,996,247 | B1 | 8/2011 | Kobori et al. |
| 8,046,244 | B1 | 10/2011 | Yager et al. |
| 8,219,427 | B1 | 7/2012 | Yager et al. |
| 8,340,983 | B2 * | 12/2012 | Grover .................. G06Q 40/08 |
| | | | 705/35 |
| 8,612,262 | B1 | 12/2013 | Condon et al. |
| 8,612,266 | B1 * | 12/2013 | Ilgenfritz ............... G06Q 40/08 |
| | | | 705/4 |
| 8,645,170 | B2 * | 2/2014 | Boone .................. G06Q 40/125 |
| | | | 705/32 |
| 8,655,690 | B2 * | 2/2014 | Tran ........................ G06Q 10/10 |
| | | | 705/4 |
| 8,712,795 | B1 * | 4/2014 | Bauer .................... G06Q 10/10 |
| | | | 705/2 |
| 8,725,541 | B2 * | 5/2014 | Andrist .................. G06Q 40/08 |
| | | | 705/4 |
| 8,768,733 | B2 * | 7/2014 | Hendrix ................. G06Q 20/10 |
| | | | 705/2 |
| 8,892,452 | B2 * | 11/2014 | Virdhagriswaran ........................ |
| | | | G06Q 10/067 |
| | | | 705/4 |
| 8,930,229 | B2 * | 1/2015 | Bowne ............... G06Q 10/0639 |
| | | | 705/4 |
| 2002/0147613 | A1 | 10/2002 | Kennard et al. |
| 2005/0096971 | A1 | 5/2005 | Baechtiger |
| 2005/0096972 | A1 | 5/2005 | Baechtiger |

OTHER PUBLICATIONS http://www.batchgeocode.com/, pp. 1-4, Apr. 7, 2008, Map Multiple Locations/Find Address Coordinates, © 2007 Phillip Homstrand.
http://map-suite-geocode-usa.thinkgeo-llc.qarchive.org/, pp. 1-2, Apr. 7, 2008, Map Suite Geocode USA 1.0.
http://www.fema.gov/plan/prevent/fhm/dl_mhip.shtm, pp. 1-5, Apr. 7, 2008, Multi-Year Flood Hazzard Identification Plan (MHIP).
http://developer.yahoo.com/maps/rest/V1/geocode.html, pp. 1-3, Apr. 7, 2008, Yahoo! Developer Network, © 2008 Yahoo! Inc.
http://www.navteq.com/about/database_about.html, p. 1, Apr. 7, 2008, Our Flagship Offering, © 2008 NAVTEQ.
http://www.geocode.com, pp. 1-2, Apr. 7, 2008, Tele Atlas Geocoding Services, © 2008 Tele Atlas.
http://www.geocode.com/index.cfm?module=abouttez, pp. 1-2, Apr. 7, 2008, Tele Atlas Geocoding Services, © 2008 Tele Atlas.
http://web.archive.org/web/20051018080503/www.point-x.com/solutions.htm, Solutions Overview, p. 1, Apr. 7, 2008, © 2005 Point-X Corporation.
http://www.point-x.com/Overview.htm, Technology, p. 1, Apr. 7, 2008, © Point-X, 6 Loch Lomond Drive, San Rafael.
http://www.point-x.com/, Point-X Location Intelligence, p. 1, Jun. 18, 2008, © 2001, Point-X, 6 Loch Lomond Drive, San Rafael.
http://www.point-x.com/AboutPointX.htm, About Point-X, p. 1, Apr. 7, 2008, © 2001, Point-X, 6 Loch Lomond Drive, San Rafael.
http://web.archive.org/web/20051018081137/www.point-x.com/clients.htm, Clients, pp. 1-2, Apr. 7, 2008, © 2005, Point-X Corporation.
http://web.archive.org/web/20051219103214/www.point-x.com/managementteam.htm, Management Team, pp. 1-2, Apr. 7, 2008, © 2005, Point-X Corporation.
http://web.archive.org/web/20051018080524/www.point-x.com/aboutpointx.htm, About Point-X, p. 1, Apr. 7, 2008, © 2005, Point-X Corporation.
Parry, Chris, "Reducing Locations, Maximizing Profit", pp. 1-2.
Jack Norman, "Insurer's record shos disparities", The Journal Staff, Milwaukee Journal, Milwaukee, Wis. : Jun. 15, 1993.
Tim J. Morris et al., "Effect of Wall-Mart Supercenters on Local Market Food Retailing: Survival Stra . . .", Journal of Business and Entrepeneurship; Mar. 1995, 1: Proquest Central, p. 31.
Store & Branch expansion Strategy—Management & Planning—Point-X Solutions Overview, http://web.archive.org/web/20051018080503/www.point-x.com/solutions.htm. Year 2005.

\* cited by examiner

Table 1

| Year | 2006 | 2007 | 2008 | 2009 | 2010 | 2011 |
|---|---|---|---|---|---|---|
| Annual Premium Growth Rate, state X | 0.37% | 0.37% | 2.27% | 2.27% | 2.27% | 2.27% |
| Annual Premium Growth Rate, state Y | 1.57% | 1.57% | 2.64% | 2.64% | 2.64% | 2.64% |

Table 2

| State X | 2005 | 2006 | 2007 | 2008 | 2009 | 2010 | 2011 |
|---|---|---|---|---|---|---|---|
| Annual Premium Growth Rate | NA | 0.37% | 0.37% | 2.27% | 2.27% | 2.27% | 2.27% |
| State-wide Auto Industry Premium | $5,706,687,000 | $5,727,646,529 | $5,748,683,038 | $5,879,214,070 | $6,012,708,972 | $6,149,235,042 | $6,288,861,107 |

Figure 2

Table 3

| Zip Code/PUMA | Total Number of HH, 2006* | Ave HH Expenditure on Vehicle Insurance, 2006** | Total Est. Expenditure on Vehicle Insurance, 2006 | Total Number of HH, 2011* | Ave HH Expenditure on Vehicle Insurance, 2011** | Total Est. Expenditure on Vehicle Insurance, 2011 |
|---|---|---|---|---|---|---|
| yyyyy | 9,117 | $1,748 | $15,936,334 | 12,667 | $1,781 | $22,564,740 |
| ... | ... | ... | ... | ... | ... | ... |
| xxxxx | 14,351 | $1,821 | $26,128,579 | 15,314 | $1,857 | $28,440,395 |
| ... | ... | ... | ... | ... | ... | ... |
| State X Total Industry Premium | | | $5,910,104,450 | | | $6,270,098,773 |

Table 4

| Total Est. Expenditure on Vehicle Insurance | 2006 | 2011 | Annual Growth Rate |
|---|---|---|---|
| zip yyyyy | $15,936,333 | $22,564,740 | 7.20% |
| zip xxxxx | $26,128,579 | $28,440,395 | 1.7% |

Figure 3

| Zip Code | Total Number of HH, 2006 | Ave HH Expenditure on Vehicle Insurance, 2006 | Total Expenditure on Vehicle Insurance, 2006 | Adjusting Factor, 2006 | Adjusted Total Expenditure on Vehicle Insurance, 2006 | Current Avg HH Auto Prem |
|---|---|---|---|---|---|---|
| xxxxx | 14,351 | $1,821 | $26,128,579 | 0.97 | $25,321,932 | 1,764 |
| yyyyy | 9,117 | $1,748 | $15,936,334 | 0.97 | $15,444,344 | 1,694 |

Table 7

Figure 5

| Zip Name | Adjusted Expenditure on Vehicle Insurance, 2006 | Provider's 2006 Total Auto Premiums | Market Share |
|---|---|---|---|
| xxxxx | $25,321,932 | $3,699,715 | 14.61% |
| yyyyy | $15,444,344 | $683,563 | 4.43% |

Table 8

Figure 6

| State X | Total Auto Premium in State X | Total Industry Premium in State X | Market Share |
|---|---|---|---|
|  | $742,646,881 | $5,727,646,529 | 12.97% |

Table 9

Figure 7

| Zip Name | 20xx Number of Auto Policy Quotes | 20xx Number of Auto Policy Sales | YTD Auto Sale-to-Quote Ratio |
|---|---|---|---|
| xxxxx | 1,284 | 316 | 24.6% |
| yyyyy | 867 | 300 | 34.6% |

Table 10

Figure 8

| Zip Name | Avg Auto Policy Premium | Est. Market Share | YTD Auto Sale-to-Quote Ratio | Addl Premium to Achieve State Mkt Share | Addl Policies to Achieve State Mkt Share | Addl Quotes to Achieve State Mkt Share |
|---|---|---|---|---|---|---|
| xxxxx | $1,500 | 14.61% | 24.6% | $0 | 0 | 0 |
| yyyyy | $1,424 | 4.43% | 34.6% | $1,318,951 | 926 | 2,675 |

Table 11

Figure 9

| Zip Name | Avg Auto Policy Premium | Addl Premium to Achieve Desired Mkt Share | Addl Policies to Achieve Desired Mkt Share | Addl Quotes to Achieve Desired Mkt Share |
|---|---|---|---|---|
| xxxxx | $1,500 | $351,794 | 235 | 955 |
| yyyyy | $1,424 | $1,787,532 | 1,255 | 3,625 |

Table 12

Figure 10

Table 13

| Zip Name | Town Name | County Name | Households (2006) | Current Auto Owning HH | Current Avg HH Auto Prem | 2006 Total Auto Market Prem |
|---|---|---|---|---|---|---|
| Zip01 | T01 | C01 | 14,351 | 14,214 | $1,764 | $25,321,932 |
| Zip02 | T02 | C02 | 8,071 | 8,016 | $1,776 | $14,332,175 |
| Zip03 | T03 | C03 | 17,349 | 16,802 | $1,684 | $29,214,624 |
| Zip04 | T04 | C04 | 14,543 | 14,189 | $1,498 | $21,778,228 |
| Totals | | | | | | $90,646,959 |

Table 14

| Zip Name | Q206 Total Auto Prem | Q206 Auto HH Cts | Q206 AutoPolicy Cts | Q206 Avg Auto HH Prem | Q206 Avg Auto Policy Prem | Est. Market Share |
|---|---|---|---|---|---|---|
| Zip01 | $3,699,715 | 2,311 | 2,466 | $1,601 | $1,500 | 14.61% |
| Zip02 | $3,783,661 | 2,284 | 2,448 | $1,657 | $1,546 | 26.40% |
| Zip03 | $3,147,315 | 2,065 | 2,221 | $1,524 | $1,417 | 10.77% |
| Zip04 | $2,243,916 | 1,732 | 1,822 | $1,296 | $1,232 | 10.30% |
| Totals | $12,874,607 | | | | | |

| Zip Name | EA | IA | Agency Deployment Index | Average Quarterly Auto Quotes | YTD Auto Sale-to-Quote Ratio |
|---|---|---|---|---|---|
| Zip01 | 1 | 0 | 2.76 | 321 | 24.6% |
| Zip02 | 3 | 0 | 2.74 | 396 | 24.3% |
| Zip03 | 3 | 0 | 2.59 | 313 | 22.6% |
| Zip04 | 4 | 0 | 2.49 | 433 | 18.1% |
| Totals | | | | | |

Table 15

1203

| Zip Name | Addl Premium to Achieve State Mkt Share | Addl Policies to Achieve State Mkt Share | Addl Quotes to Achieve State Mkt Share | Addl Premium to Achieve Desired Mkt Share | Addl Policies to Achieve Desired Mkt Share | Addl Quotes to Achieve Desired Mkt Share |
|---|---|---|---|---|---|---|
| Zip01 | $0 | 0 | 0 | $351,794 | 235 | 955 |
| Zip02 | $0 | 0 | 0 | $0 | 0 | 0 |
| Zip03 | $640,653 | 452 | 1,998 | $1,527,025 | 1,078 | 4,762 |
| Zip04 | $579,843 | 471 | 2,604 | $1,240,600 | 1,007 | 5,572 |
| Totals | $1,220,496 | 923 | 4,602 | $3,119,419 | 2,320 | 11,289 |

Table 16

Figure 12

Table 17

| Zip Code | Total Number of HH, 2006* | Total Number of Auto Owning HH, 2006* | Ratio of Auto Owning HH to Total HH |
|---|---|---|---|
| Zip001 | 6,671 | 2,163 | 32% |
| Zip002 | 37,182 | 12,410 | 33% |
| ... | | | |
| Zip099 | 18,232 | 16,837 | 92% |
| Zip100 | 33,834 | 9,623 | 28% |

Table 18

| Zip Code | Total Number of HH, 2006* | Total Number of Auto Owning HH, 2006* | Ratio of Auto Owning HH to Total HH | Ave HH Expenditure on Vehicle Insurance, 2006** | Total Est. Expenditure on Vehicle Insurance, 2006 | Total Number of HH, 2011* | Total Number of Auto Owning HH, 2011* | Ave HH Expenditure on Vehicle Insurance, 2011** | Total Est. Expenditure on Vehicle Insurance, 2011 |
|---|---|---|---|---|---|---|---|---|---|
| Zip001 | 6,671 | 2,163 | 32% | $1,980 | $4,282,091 | 8,230 | 3,052 | $2,096 | $6,398,091 |
| Zip002 | 37,182 | 12,410 | 33% | $2,138 | $26,536,427 | 38,952 | 15,019 | $2,226 | $33,430,942 |
| Zip100 | 33,834 | 9,623 | 28% | $1,763 | $16,965,253 | 35,266 | 12,212 | $1,840 | $22,465,195 |
| ... | | | | | | | | | |
| Zip099 | 18,232 | 16,837 | 92% | $1,226 | $22,345,686 | 19,915 | 18,989 | $1,268 | $25,255,406 |
| ... | | | | | | | | | |
| State X Total Industry Premium | | | | | $7,123,233,090 | | | | $7,590,958,464 |

Figure 13

INSURANCE PREMIUM GAP ANALYSIS

CROSS-REFERENCE TO RELATED APPLICATIONS

This application is a divisional application of U.S. application Ser. No. 13/705,755, filed Dec. 5, 2012, now U.S. Pat. No. 9,704,199 which is a continuation of U.S. application Ser. No. 13/175,490, filed Jul. 1, 2011, issued as U.S. Pat. No. 8,352,295 on Jan. 8, 2013, which is a continuation of U.S. application Ser. No. 12/141,758, filed Jun. 18, 2008, which issued as U.S. Pat. No. 7,996,247 on Aug. 9, 2011, which claims priority to U.S. Provisional Application No. 60/952,984, filed Jul. 31, 2007, the entire contents of which are all herein incorporated by reference in their entirety.

FIELD OF THE INVENTION

The present invention provides methods and systems for determining insurance premium opportunities in various markets. More particularly, the invention provides a method of determining the amount of premium needed to improve market share in various geographic locations based on user selected criteria.

BACKGROUND

Benchmarking provides information that is useful to identify opportunities and establish targets and goals. Currently, benchmarking information in the insurance industry utilizes historical aggregated data at a state level for use in analysis of an insurance provider's performance as compared to industry competitors.

However, the use of such high level data, "state level data," results in suboptimal planning as it does not provide sufficient detail to analyze or distinguish areas within each state which may provide future opportunities. For example, a state may have a total premium of several billions of dollars but eighty percent of that total premium may be located in just a few cities or municipalities located within that state. The overall state number, though useful, does not provide sufficient information to develop future goals targeted to specific geographic regions within a state.

Therefore, there is a need in the art for a method and system for allocating information pertaining to a large geographic region into smaller geographic regions so that future goals may be developed in strategic markets. The method and system must provide consistent and easily interpreted results.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to providing a method of determining the amount of premium needed to improve market share in various geographic locations based on user selected criteria.

In an aspect of the invention, information relating to the automobile insurance industry may be reported to a third-party benchmarking company such that data concerning the industry may be calculated on a state level. Such historical industry data may be useful for benchmarking and future planning purposes. For example, A.M. Best Company collects information from insurance providers and provides suppliers of such information aggregate data which includes historical total state premiums for the automobile insurance industry.

In another aspect of the invention, state level data may be separated and placed on a zip code level providing information for smaller geographic regions. The zip code level data may be used to forecast future premiums. In an embodiment, based on user selection of a geographic region such as a state, the underlying zip codes for the selected geographic region may be determined. The use of zip codes enables users to target specific areas to increase market share and grow revenue. Placing the information on a zip code level may enable users to determine which markets are growing and/or where users may have greater opportunity. This enables marketing and agency activity to be targeted to the area. In another embodiment, state level data may be separated and placed on a PUMA level.

In another aspect of the invention, an insurance company's market share may be compared to a state's overall market. The state's overall market along with the insurance company's share may be calculated and displayed on a zip code level. In an embodiment, based on a user's inputted desired target market share per zip code, the number of corresponding automobile insurance quotes needed to be generated in order to obtain a corresponding number of new policies may be calculated.

In another aspect of the invention, the additional premium, policies, and quotes needed to achieve a specific market share in each zip code may be calculated.

In another aspect of the invention, large urban areas where a large percentage of households do not own automobiles may require some modifications to the above explained steps and/or calculations. In these areas, the following may be used to estimate the total market size at the zip code level. In an aspect of the invention, a statewide premium may be calculated using demographic and expenditure data from U.S. Census Bureau and Bureau of Labor Statistics.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 2 illustrates in Table 1 an estimated total premium growth rate for a State X and a State Y, and in Table 2 the application of the annual growth rates determined in Table 1 to 2005 total premium for State X.

FIG. 3 illustrates in Table 3 a calculation of statewide premium for State X on a zip code level, and in Table 4 the annual growth rate for State X on a zip code level.

FIG. 5 illustrates in Table 7 the adjusted total household expenditure and average household expenditure for automobile insurance for year 2006.

FIG. 6 illustrates in Table 8 the data for an insurance provider having illustrative 2006 data.

FIG. 7 illustrates in Table 9 the calculated market share for an insurance provider on a statewide level.

FIG. 8 illustrates in Table 10 the calculated year-to-date automobile sale-to-quote ratios on a zip code level.

FIG. 9 illustrates in Table 11 an estimation of additional premium, policies, and quotes needed to achieve a state's average market share in each zip code.

FIG. 10 illustrates in Table 12 a calculation of additional premium, policies, and quotes needed to obtain a sixteen percent market share in two zip codes.

FIG. 11 illustrates in Tables 13 and 14 examples of a single report for users which can include many different user selected categories.

FIG. 12 illustrates in Tables 15 and 16 further examples of a single report for users.

FIG. 13 illustrates in Table 17 a calculation of the ratio of automobile owning households to total households in 2006, and in Table 18 a calculation of the total estimated expenditure on vehicle insurance for the years of 2006 and 2011.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Exemplary Operating Environment

Figure 1:
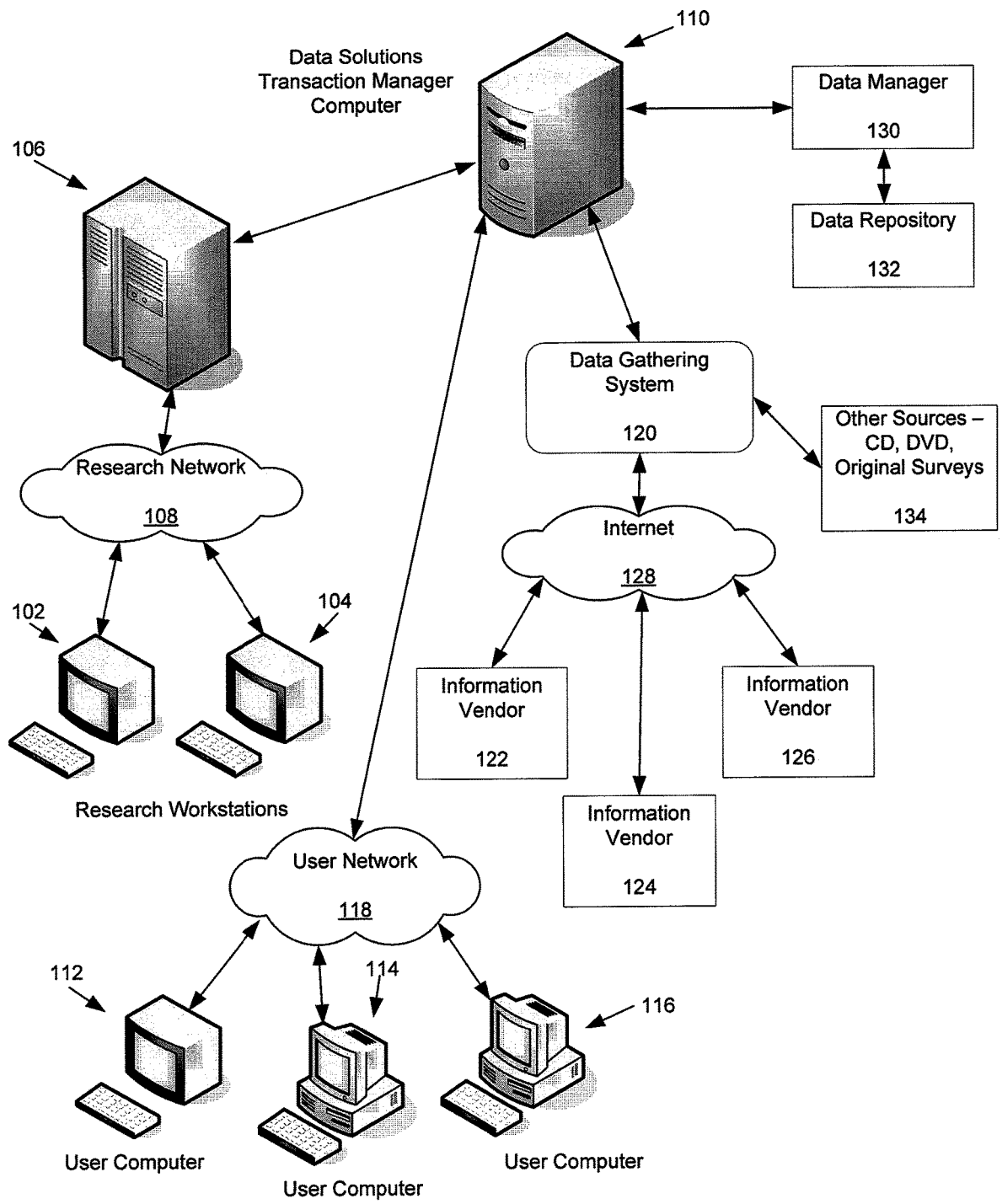
FIG. 1 illustrates a diagram of a computer system that may be used to implement aspects of the invention.

FIG. 1 shows a diagram of a computer system that may be used to implement aspects of the invention. A plurality of computers, such as research workstations 102 and 104, may be coupled to user computers 112, 114, and 116 via networks 108 and 118. User computer 112 may be coupled to a data solutions transaction manager computer 110, which is described in detail below. User computers 112, 114, and 116 provide decision makers with a user interface for displaying information regarding performance such as market share and enable users to interact with data solutions transaction manager computer 110.

User computers 112, 114 and 116 and research workstations 102 and 104 may require information from external data sources to assist in evaluation of market share or other industry benchmarks. Requests for such information may be transmitted via data solutions transaction manager computer 110 to a data gathering system 120. Data gathering system 120 may include a processor, memory and other conventional computer components and may be programmed with computer-executable instructions to communicate with other computer devices. Data gathering system 120 may access original primary survey data 134 and external sources of information, such as information vendors 122, 124 and 126 via the Internet 128. Information vendors may include federal or state agencies that provide census type information and/or other geographical type data such as maps.

An exemplary information vendor or source that may provide data on population and housing characteristics within the United States is the American Community Survey (ACS). ACS is an official survey of the U.S. Census Bureau. ACS data is organized by a new census geography called a Public Use Micro-data Area (PUMA). Those skilled in the art will recognize the ability to calculate estimates and forecasts of population and housing characteristics of each PUMA, state, and the country. PUMAs represent special non-overlapping areas that partition a state. In general, a PUMA represents an area which may include all or part of several zip codes. In an embodiment, the United States may be divided up and represented by 2,071 PUMAs.

Data solutions transaction manager 110 may be programmed with computer-executable instructions to receive requests for data from user computers 112, 114 and 116 and research workstations 102 and 104, format the requests and transmit the requests to data gathering system 120. In one embodiment of the invention, requests for data are in the form of documents that are in extensible markup language (XML) format. Data solutions transaction manager 110 may also be coupled to a data manager computer device 130 that accesses customer data stored in a data repository 132. In one embodiment of the invention, all data gathered on a customer or potential customer is stored in data repository 132 so that when additional requests are made for the same data, the data may quickly be obtained without requesting it from information vendors 122, 124 and 126. Data repository 132 may be implemented with a group of networked server computers or other storage devices.

Users or decision makers may be provided with a user interface on user computers 112, 114 and 116 for displaying interactive maps to enable users to display target markets by zip code for increasing automobile policies in a target geographic region. The user or decision maker may select and run various reports to obtain benchmarking or performance type information.

One or more of the computer devices and terminals shown in FIG. 1 may include a variety of interface units and drives for reading and writing data or files. One skilled in the art will appreciate that networks 108, 118 and 128 are for illustration purposes and may be replaced with fewer or additional computer networks. One or more networks may be in the form of a local area network (LAN) that has one or more of the well-known LAN topologies and may use a variety of different protocols, such as Ethernet. One or more of the networks may be in the form of a wide area network (WAN), such as the Internet. Computer devices and other devices may be connected to one or more of the networks via twisted pair wires, coaxial cable, fiber optics, radio waves or other media.

The term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks.

Exemplary Embodiments

The present invention includes methods and systems for determining insurance premium opportunities in various markets. More particularly, the invention provides a method of determining the amount of automobile premium needed to increase market share in various geographic locations based on user selected criteria. Those skilled in the art will realize that the following detailed description is not intended to be limited to just automobile insurance but may encompass other insurance industry products including but not limited to homeowners insurance, condominium insurance, renters insurance, scheduled personal property insurance, business umbrella insurance, commercial insurance, motorcycle insurance, boat insurance, recreational vehicle insurance, and flood insurance. Furthermore, other insurance products that may benefit from various aspects of the invention include term insurance, whole life insurance, universal life insurance (UL), and single-premium life insurance (SPL). Those skilled in the art will realize that use of automobile premiums in the following exemplary embodiments are illustrative of the invention and are not intended to be limiting.

FIG. 2 illustrates an estimated annual premium growth rate in Table 1 202 for a State X 204 and a State Y 206. In an aspect of the invention, a projection may be made for total industry premiums based on historical data and information received from other parties such as field product managers. Those skilled in the art will realize that growth rates for each state may be different and may change significantly from year-to-year. In addition, growth rates may be periodically updated for each state on a scheduled or unscheduled basis.

For example, a projection may be made for years 2006 through 2011 208 for the total industry premium in a State X 204 based on historical data supplied from an information supplier. In this exemplary embodiment, 2005 is the latest premium information available from the information source on a state level. Furthermore, in the following exemplary embodiment, years 2006 through 2011 208 represent future forecasts of automobile premiums.

In Table 1 202, the annual premium growth rate for a State X 204 in year 2006 and 2007 may be 0.37 percent 210. Moreover, the annual premium growth rate for State X 204 in years 2008 through 2011 may increase to 2.27 percent 212. Table 1 202 also illustrates an exemplary premium growth rate for State Y 206 which in this embodiment is different than the premium growth rate of State X 204. For simplification purposes the following discussion will follow State X 204 through an exemplary embodiment. Furthermore, those skilled in the art will realize that the results may vary depending upon the rounding convention used in the below described calculations and associated figures.

In FIG. 2, Table 2 214 illustrates the application of the annual growth rates determined in Table 1 202 to the received 2005 total premium 216 for State X 204. For instance, the state-wide auto industry premium for State X 204 in years 2006 through 2011 218 may be calculated as follows:

State $X=(1+a)*g=h=$
$5,727,646,529    Statewide Projected 2006 Auto Premium,

State $X=(1+b)*h=i=$
$5,748,683,038    Statewide Projected 2007 Auto Premium,

State $X=(1+c)*i=j=$
$5,879,214,070    Statewide Projected 2008 Auto Premium,

State $X=(1+d)*j=k=$
$6,012,708,972    Statewide Projected 2009 Auto Premium,

State $X=(1+e)*k=l=$
$6,149,235,042    Statewide Projected 2010 Auto Premium,

State $X=(1+f)*l=m=$
$6,288,861,107    Statewide Projected 2011 Auto Premium,

The variables used in the above and later described equations are shown in corresponding FIGS. 2 to 13. The above projected statewide automobile industry premiums 218 for years 2006 through 2011 218 are displayed in FIG. 2.

FIG. 3 illustrates a calculation of statewide premium for State X 204 on a zip code level in accordance with an aspect of the invention. In another embodiment, the calculation may be made on a PUMA level. The calculation of statewide premium for State X may use demographic information available from the U.S. Census and Bureau of Labor Statistics. For example, Table 3 302 of FIG. 3 may estimate the total expenditure on automobile insurance in a zip code (or PUMA) by multiplying the number of households (HH) in the zip code (or PUMA) with an average expenditure on vehicle insurance in that zip code (or PUMA). For instance, the total estimated expenditures on vehicle insurance for a zip code xxxxx 303 may be calculated as follows:

2006 estimated expenditure on Vehicle Insurance in
   zip code $xxxxx=(n)*(o)=(n2)$ 2011 estimated expenditure on Vehicle Insurance in
   zip code $xxxxx=(n1)*(o1)=(o2)$ As an example, the estimated expenditures on vehicle insurance 305 in State X 204 for zip code xxxxx 303 may be calculated as the number households in a particular year 304 times the average household expenditure on vehicle insurance spent 306 in that same year. Therefore for 2006, the average household expenditure on vehicle insurance equals $26,128,579 308.

The 2006 estimated total expenditures on vehicle insurance 310 in State X 204 may be calculated using the formula:

$$\sum_{zip5, stateX} \text{vehicle expenditure}_{2006} = y1 = \$5,910,104,450$$

Similarly, the 2011 estimated total expenditures on vehicle insurance 312 in State X 204 may be calculated using the formula:

$$\sum_{zip5, stateX} \text{vehicle expenditure}_{2011} = y2 = \$6,270,098,773$$

In Table 4 314 of FIG. 3, an annual growth rate for each zip code may be calculated assuming constant or variable growth by year. The constant annual growth rate for each zip code may be calculated as follows:

$$\text{Annual Growth Rate, zip } yyyyy = \sqrt[5]{\frac{q1}{p1}} - 1 = 7.2\% \quad (r1)$$

$$\text{Annual Growth Rate, zip } xxxxx = \sqrt[5]{\frac{q}{p}} - 1 = 1.7\% \quad (r)$$

For example, Table 4 314 of FIG. 3 shows that for zip code xxxxx, the annual growth rate between years 2006 and 2011 may be 1.7 percent 316. Using this growth rate per zip code, an estimated expenditure on vehicle insurance may be calculated by applying the constant growth factor shown in Table 4 314.

Figure 4:
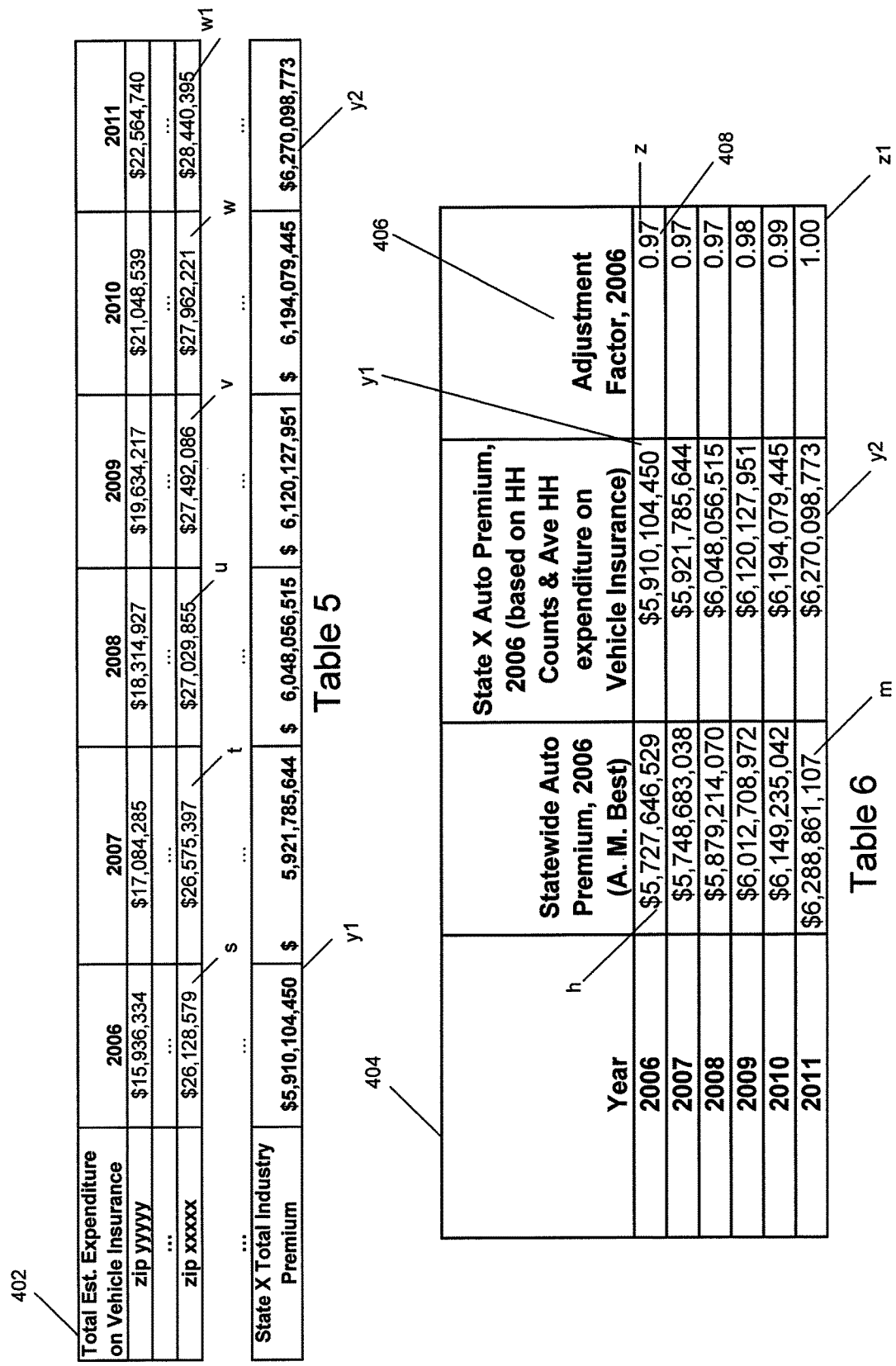
FIG. 4 illustrates in Table 5 a calculation of statewide premium for each of years 2006 to 2011 for State X on a zip code level, and in Table 6 a calculation of state level adjustment factor for each of years 2006 to 2011.

The total estimated expenditures on vehicle insurance per zip code may be calculated and summed up to determine a state total industry premium for years 2007 through 2011. For example, Table 5 402 of FIG. 4 illustrates calculating expenditure on vehicle insurance per zip code from 2007 to 2011 as follows:

(Note: "r" first appears in FIG. 3, Table 4)

2007 Total Industry Premium in Zip Code xxxxx
$s \times (1+r) = \$26,575,397$ (t)

2008 Total Industry Premium in Zip Code xxxxx
$t \times (1+r) = \$27,029,855$ (u)

2009 Total Industry Premium in Zip Code xxxxx
$u \times (1+=r) = \$27,492,086$ (v)

2010 Total Industry Premium in Zip Code xxxxx
$v \times (1+r) = \$27,962,221$ (w)

2011 Total Industry Premium in Zip Code xxxxx
$w \times (1+r) = \$28,440,395$ (w1)

The estimated expenditures on vehicle insurance per zip code may be summed to determine a total industry premium as illustrated in y1 and y2 (FIG. 4, Table 5) for years 2006 and 2011.

In Table 6 404 of FIG. 4, the statewide automobile premium calculated in FIG. 2, Table 2 214 may be reconciled with the statewide automobile premium calculated in Table 5 402 of FIG. 4. In particular, a state level adjustment factor 406 may be calculated for each of years 2006 to 2011. The state level adjustment factor 406 may be different each year and may change for each state. The state level adjustment factor 406 may be applied to results shown in Table 5 402 so that it matches the total premium calculation in Table 2 214.

The adjustment factor 406 for each year may be calculated as follows:

Adjustment Factor, $2006 = h/y1 = z$

Adjustment Factor, $2011 = m/y2 = z1$

Where y1 and y2 are the sums of the computation at the zip code level. For example, the calculated adjustment factor for 2006 may be 0.97 408 as further shown in FIG. 4.

In an aspect of the invention, the calculated adjustment factor 408 may be applied to individual zip codes to calculate an adjusted total household expenditure and average household expenditure for automobile insurance. For example, FIG. 5 illustrates in Table 7 502 the adjusted total household expenditure and average household expenditure for automobile insurance for year 2006. The adjustment factor may be applied to each of the additional future years 2007 through 2011. The adjusted total household expenditure and average household expenditure for automobile insurance per zip code may be calculated as follows:

Adjusted Expenditure on Vehicle Insurance,
2006 = Total Number of $HH$, 2006 * Ave $HH$
Vehicle Insurance Expenditure, 2006 * Adjustment Factor Adjusted Expenditure on Vehicle Insurance,
$2006 = n*o*z = aa$ Current Average $HH$ Auto Premium $= aa/n = aab$ Next, the market share for an insurance provider may be calculated at a zip code level.

Each insurance provider may utilize their specific policy data to determine their portion of market share. For example, FIG. 6 includes Table 8 602 which provides data for an insurance provider having illustrative 2006 data. As may be seen in Table 8 602, an insurance provider market share may be calculated as follows:

Insurance Provider's Market Share = Provider's Auto
Insurance Annualized written premium/Total
Adjusted Expenditure on Vehicle Insurance Insurance Provider Market Share $= bb/aa = cc$ A statewide market share may be calculated in accordance with an aspect of the invention. For instance, FIG. 7 illustrates in Table 9 702 the calculated market share for an insurance provider on a statewide level. The statewide market share may be calculated as follows:

Provider Auto Premium $= dd$ $$\sum_{zip, state X}$$

Mkt Share in State $X = ee = dd \div h = 12.97\%$

As shown in FIG. 7, the statewide market share for the displayed insurance provider may be equal to 12.97% 704.

In another aspect of the invention, a year-to-date automobile sale-to-quote ratio may be calculated. This ratio may enable sales teams to determine the number of quotes needed to obtain a certain sales goal. For instance, the year-to-date automobile sales-to-quote ratio ff (FIG. 8, Table 10) may be calculated by taking an insurance provider's year-to-date new automobile policy sales n2 divided by year-to-date new automobile policy quotes n3. FIG. 8, Table 10 802 illustrates year-to-date automobile sale-to-quote ratios on a zip code level.

Year-to-Date Automobile Sales-to-Quote
Ratio = Provider's Auto Insurance Year-to-Date
Policy Sales/Year-to-Date Auto Policy Quotes Sales-to-Quote Ratio $= n2/n3 = ff$ FIG. 9 illustrates an estimation of additional premium, policies, and quotes needed to achieve a state's average market share in each zip code. For instance, Table 11 902 of FIG. 9 shows on a zip code level the amount of additional premium 904 needed to achieve State X's 204 market share 704. In addition, Table 11 902 shows for State X 204 on a zip code level, the additional policies 906 and quotes 908 needed to achieve State X's 204 market share 704 on a zip code level. The additional premium 904, policies 906, and quotes 908 needed may be calculated as follows:

Note: "ee" first appears in FIG. 7, "aa" first appears in FIG. 6

If cc≥ee, gg=0, hh=0, ii=0
If cc<ee, gg=(ee−cc)×aa
hh=gg/jj, ii=hh/ff
For zip xxxxx
∵14.61%>12.97%
∴gg=0=hh=ii
For Zip yyyyy
∵4.43%<12.97%
∴gg=(12.97%−4.43%)×15,444,344=1,318,951
Add'l policies to achieve state mkt share
hh=1,318,951÷1,424=926
Add'l quotes to achieve state mkt share
ii=926÷34.6%=2675
The results for State X 204 and State Y 206 are shown in Table 11 902 of FIG. 9.

In another aspect of the invention, the additional premium, policies, and quotes needed to achieve a specific market share in each zip code may be calculated. For example, if a sixteen percent market share is desired per zip code for a particular state, then the additional premium, policies and quotes needed to obtain this market share may be calculated. FIG. 10 shows a Table 12 1002 which calculates additional premium, policies, and quotes needed to obtain a sixteen percent market share in two zip codes. The additional premium, policies, and quotes needed may be calculated as follows:

For zip xxxxx,
∴Desired MktShare=16%>14.61%
∴kk=(16%−14.61%)×25,321,932=351,794
ll=kk/jj=351,794÷1,500=235
mm=ll÷ff=235÷24.6%=955

For zip yyyyy,
∴Desired Mkt Share=16%>4.43%
∴kk=(16%−4.43%)×15,444,344=1,787,532
ll=kk/jj=1,787,532÷1424=1255
mm=ll/ff=1255/34.6%=3625

In another aspect of the invention, the above calculated values may be integrated into a single report for users as illustrated in FIG. 11 (Table 13 1102, Table 14 1103) and FIG. 12 (Table 15 1202, Table 16 1203). The information may include a wealth of information including but not limited to the following:

| |
|---|
| Demographic Data |
| Zip Code |
| Town Name |
| County Name |
| Households |
| Auto Owning HH |
| Market Data |
| Current Avg HH Auto Premium |
| A.M. Best Statewide total premium |
| Total Auto Market Premium |
| at zip code level |
| Insurance Provider Matrix & Analytics |
| State Level Market Share |
| Total Auto Premium |
| Auto HH Counts |
| Auto Policy Counts |
| Avg. Auto HH Premium |
| Avg. Auto Pol Premium |
| Zip Code Level Market Share |
| Exclusive Agent Counts |
| Independent Agent Count |
| Agency Deployment Index |
| Average Quarterly Auto Quotes |
| YTD Sale-to-Quote Ratio |
| Calculated Fields based on Demographic, Total Market, and Insurer's Matrix & Analytics |
| Additional Premium to achieve state average market share |
| Additional Policies to achieve state average market share |
| Additional Quotes to achieve state average market share |
| Interactive Fields based on User's Input on desired marketshare |
| Additional Premium to achieve desired market share |
| Additional Policies to achieve desired market share |
| Additional Quotes to achieve desired market share |

In accordance with an aspect of the invention, large urban areas where a large percentage of households do not own automobiles may require some modifications to the above explained steps and/or calculations. For example, the Manhattan area of New York State includes a large percentage of households that do not own automobiles. In these areas, the following may be used to estimate the total market size at the zip code level.

In an embodiment, a local market ratio for automobile-owning/total number of households may be used. For example, using a local market ratio of 0.7, if the ratio of actual automobile-owning/total number of households ≥0.7, the calculation remains the same. However, in an alternative embodiment, if the ratio of actual automobile-owning households/total number of households <0.7, the method may be amended to multiply the automobile owning household count and average household automobile insurance expenditure to estimate total expenditure in the zip code. As those skilled in the art will realize, the local market ratio of automobile-owning/total number of households used in the above example (0.7) is exemplary and may be changed based on the local market conditions in other embodiments of the invention.

Next, the ratio of automobile owning households to total households may be calculated by zip code for New York State as shown in FIG. 13, Table 17 1302. Finally, the household expenditure on automobile insurance may be multiplied with the automobile owning household count to calculate total industry premium in each zip code such as zip001 1304, zip002 1306, and zip100 1307. The average household expenditure on automobile insurance multiplied by the total household count may provide the total industry premium in a particular zip code, such as zip099 1308. For instance, for zip codes zip001 1304, zip002 1306, and zip100 1307 have a ratio of automobile-owning households/total Number of households <0.7, (Table 18 1303 of FIG. 13) and therefore:

$$\because oo<70\% \therefore ss=qq \times rr, yy=ww \times xx$$

Zip099 1308 has an automobile-owning/total number of households ≥0.7 and therefore:

$$\because zz\ 70\%\ dd1=aa1 \times cc1, hh1=ee1 \times gg1$$

The total New York State automobile industry premium may be calculated for 2006 as follows:

$$\Sigma \text{total vehicle expenditure}=jj1=7,123,233,090$$

The total New York State automobile industry premium may be calculated for 2011 as follows:

$$\Sigma \text{total vehicle expenditure}=kk1=7,590,958,464$$

While the invention has been described with respect to specific examples including presently preferred modes of carrying out the invention, those skilled in the art will appreciate that there are numerous variations and permutations of the above described systems and techniques that fall within the spirit and scope of the invention.

What is claimed is:

1. A method comprising:
   (a) using a processor associated with a computer, retrieving, through a data transaction manager, historical premium data from a data source, wherein the data transaction manager is configured to:
      i. format a request for the historical premium data into a markup language document; and
      ii. store the historical premium data in a data storage system for future retrieval without requiring a further request to the data source;
   (b) using the processor, calculating a first set of future state-wide industry insurance premiums based on projected annual premium growth rates and a historical state-wide industry insurance premium specified in the retrieved historical premium data;

(c) using the processor, calculating a second set of future state-wide industry insurance premiums based on information related to a total number of households per zip code, a total number of auto-owning households per zip code, and average insurance expenditures per household per zip code;

(d) using the processor, calculating an adjustment factor based on the calculated first set and second set of future state-wide industry insurance premiums;

(e) using the processor, applying the calculated adjustment factor to a total expenditure of insurance per zip code to determine an adjusted total expenditure of insurance per zip code; and (f) using the processor, calculating an expected market share for a given insurance provider based on the adjusted total expenditure of insurance per zip code.

2. The method of claim 1, further including retrieving, through the data transaction manager, demographic data, a request for the demographic data also be formatted according to the markup language document, and:

(g) displaying an output on a display associated with the computer, the output including demographic data, market data, and insurance provider information.

3. The method of claim 2, wherein the demographic data includes data organized by zip code, the demographic data comprising a town name, a county name, an amount of households, and an amount of automobile owning households.

4. The method of claim 2, wherein the market data includes a current average household premium by zip code, a statewide total premium, and a total insurance premium by zip code.

5. The method of claim 2, wherein the insurance provider information includes a state level market share, a total insurance premium, a household count, a policy count, an average household premium, an average policy premium, a zip code level market share, an exclusive agent count, an independent agent count, an agency deployment index, an average of quarterly quotations, and a year-to-date sale-to-quote ratio.

6. The method of claim 2, wherein the insurance provider information is separated and displayed by zip code.

7. The method of claim 1, wherein the historical premium data is retrieved from a remote computing device.

8. The method of claim 1, wherein the information related to the total number of households per zip code, the total number of auto-owning households per zip code, and the average insurance expenditures per household per zip code is received from an external computing device through the data transaction manager.

9. The method of claim 1, wherein the expected market share comprises automobile insurance market share.

10. An apparatus comprising:
a processor; and
memory storing computer readable instructions that, when executed, cause the processor to:
retrieve, through a data transaction manager, historical premium data from a data source, wherein the data transaction manager is configured to format a request for the historical premium data into a markup language document, and interface with a data gathering system to obtain the historical premium data from one or more sources;
calculate a first set of future state-wide industry insurance premiums based on projected annual premium growth rates and a historical state-wide industry insurance premium specified in the retrieved historical premium data;
calculate a second set of future state-wide industry insurance premiums based on information related to a total number of households per zip code, wherein the information related to the total number of households per zip code is also retrieved through the data transaction manager;
calculate an adjustment factor based on the calculated first set and second set of future state-wide industry insurance premiums;
apply the calculated adjustment factor to a total expenditure of insurance per zip code to determine an adjusted total expenditure of insurance per zip code; and
calculate an expected market share for a given insurance provider based on the adjusted total expenditure of insurance per zip code.

11. The apparatus of claim 10, further comprising instructions that, when executed, cause the apparatus to:
retrieve, through the data transaction manager, demographic data, a request for the demographic data also being formatted according to the markup language document; and
display an output on a display associated with the computer, the output including demographic data, market data, and insurance provider information.

12. The apparatus of claim 11, wherein the demographic data includes data organized by zip code, the demographic data comprising a town name, a county name, an amount of households, and an amount of automobile owning households.

13. The apparatus of claim 11, wherein the market data includes a current average household premium by zip code, a statewide total premium, and a total insurance premium by zip code.

14. The apparatus of claim 11, wherein the insurance provider information includes a state level market share, a total insurance premium, a household count, a policy count, an average household premium, an average policy premium, a zip code level market share, an exclusive agent count, an independent agent count, an agency deployment index, an average of quarterly quotations, and a year-to-date sale-to-quote ratio.

15. The apparatus of claim 11, wherein the insurance provider information is separated and displayed by zip code.

16. The apparatus of claim 10, wherein the historical premium data is retrieved from a remote computing device.

17. The apparatus of claim 10, wherein the one or more sources includes an external computing device.

18. An apparatus comprising:
a processor; and
memory storing computer readable instructions that, when executed, cause the processor to:
retrieve, through a data transaction manager, historical premium data from a data source, wherein the data transaction manager is configured to format a request for the historical premium data into a markup language document;
cause the data transaction manager to store the historical premium data in a data storage system for future retrieval without requiring a further request to the data source;
calculate a first set of future state-wide industry insurance premiums based on projected annual premium growth rates and a historical state-wide industry insurance premium specified in the retrieved historical premium data;

calculate a second set of future state-wide industry insurance premiums based on information related to a total number of households per zip code;

calculate an adjustment factor based on the calculated first set and second set of future state-wide industry insurance premiums;

apply the calculated adjustment factor to a total expenditure of insurance per zip code to determine an adjusted total expenditure of insurance per zip code; and calculate an expected market share for a given insurance provider based on the adjusted total expenditure of insurance per zip code.

19. The apparatus of claim 18, further comprising instructions that, when executed, cause the apparatus to:

retrieve, through the data transaction manager, demographic data, a request for the demographic data also being formatted according to the markup language document; and display an output on a display associated with the computer, the output including demographic data, market data, and insurance provider information.

20. The apparatus of claim 18, wherein the instructions, when executed, further cause the apparatus to:

transmit a further request for the historical premium data through the data transaction manager; and receive the demographic data from the data storage system and through the data transaction manager without requesting the demographic data from the data source.

\* \* \* \* \*